(12) United States Patent
Koehler (10) Patent No.: US 12,462,920 B2
(45) Date of Patent: Nov. 4, 2025

(54) PLANNING OF WIDE-COVERAGE AXIAL CT SCANS

(71) Applicant: KONINKLIJKE PHILIPS N.V., Eindhoven (NL)

(72) Inventor: Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 197 days.

(21) Appl. No.: 18/287,261

(22) PCT Filed: Apr. 6, 2022

(86) PCT No.: PCT/EP2022/059119
§ 371 (c)(1),
(2) Date: Oct. 17, 2023

(87) PCT Pub. No.: WO2022/223296
PCT Pub. Date: Oct. 27, 2022

(65) Prior Publication Data
US 2024/0371498 A1 Nov. 7, 2024

(30) Foreign Application Priority Data
Apr. 21, 2021 (EP) .................................... 21169685

(51) Int. Cl.
*A61B 6/03* (2006.01)
*A61B 6/00* (2006.01)
(Continued)

(52) U.S. Cl.
CPC ............. *G16H 30/20* (2018.01); *A61B 6/032* (2013.01); *A61B 6/465* (2013.01); *A61B 6/467* (2013.01);
(Continued)

(58) Field of Classification Search
CPC ........... G06T 1/00; G06T 1/0007; G06T 5/00; G06T 7/97; G06T 7/30; G06T 11/003;
(Continued)

(56) References Cited

U.S. PATENT DOCUMENTS

2007/0201610 A1 8/2007 Adachi
2008/0205587 A1 8/2008 Nakanishi
(Continued)

FOREIGN PATENT DOCUMENTS

JP 2008302099 A 12/2008
RU 2550542 C2 * 5/2015 ........... G06T 11/006
WO WO2015112425 A2 7/2015

OTHER PUBLICATIONS

PCT International Search Report, International application No. PCT/EP2022/059119, Jun. 20, 2022.
(Continued)

*Primary Examiner* — Don K Wong
(74) *Attorney, Agent, or Firm* — Larry Liberchuk (57) ABSTRACT

The present invention relates to a device (10) and related method and computer-program product for planning an acquisition by a CT scanner (20). The device receives a pre-scan image of the object from the scanner via an input (12). A processor (16), in use of the device, obtains a parameter selection based on the pre-scan image, in which this parameter selection comprises at least axial upper and lower scan range limits of a region of the object to be scanned. The processor determines a value indicative of an image gradient or gradient component in the pre-scan image at the upper and/or lower scan range limit or in a predetermined neighborhood thereof. If this value exceeds a threshold, a user is informed via an output (18) that the selected scan range does not satisfy a quality criterium for reconstruction and/or a new parameter selection is determined by
(Continued)

repositioning, resizing and/or changing an orientation of the selected region to be scanned.

15 Claims, 3 Drawing Sheets

(51) Int. Cl.
    *A61B 6/46*     (2024.01)
    *G01T 1/20*     (2006.01)
    *G16H 30/20*     (2018.01)

(52) U.S. Cl.
    CPC .............. *A61B 6/488* (2013.01); *A61B 6/545* (2013.01); *G01T 1/20182* (2020.05)

(58) Field of Classification Search
    CPC ..... G06T 11/005; G06T 1/20; G06T 2211/00; G06T 2211/40; G06T 2201/00; G06T 2200/00; G06T 2200/08; A61B 6/48; A61B 6/488; A61B 6/52; A61B 6/5258; A61B 2576/00; A61B 6/032

See application file for complete search history.

(56) References Cited

U.S. PATENT DOCUMENTS

| | | |
|---|---|---|
| 2011/0150173 A1 | 6/2011 | Shinno |
| 2014/0147026 A1 | 5/2014 | Liu |
| 2014/0185740 A1 | 7/2014 | Chen |

OTHER PUBLICATIONS

Oldham M. et al., "Cone-Beam-CT Guided Radiation Therapy: A Model for On-Line Application", Radiotherapy and Oncology, vol. 75, pp. 271.e1-271.e8, 2005.

\* cited by examiner

PLANNING OF WIDE-COVERAGE AXIAL CT SCANS

FIELD OF THE INVENTION

The present invention relates to the field of computed tomography, and, more specifically, the invention relates to a method and related device for accurately planning an axial image acquisition for a wide-detector computed tomography scanner.

BACKGROUND OF THE INVENTION

A trend exists in the field of computed tomography (CT) to evolve toward higher numbers of detector rows in the CT system, which, among other advantages, can lead to reduced image acquisition times. While development of multidetector computed tomography started with 4-detector-row systems, the technology has quickly advanced over 16-row and 64-row systems to 256-row technology, and even higher numbers (e.g. 320, 512, . . . ). For example, a system with 320 detector rows and having a detector element width of about 0.5 mm can cover a range of 16 cm without requiring translation of the patient during imaging, e.g. in an axial imaging mode as opposed to a helical imaging protocol.

Wide-detector systems, e.g. covering 16 cm or more along the longitudinal axis (typically substantially aligned with the craniocaudal axis), can be useful for applications such as cardiac imaging and neuroimaging, since volumetric imaging of the entire heart and/or (at least a substantial part of) the brain can be achieved in (e.g.) less than a second or a few seconds, and without moving the patient back and forth during the image acquisition. This may reduce motion artefacts, decrease the required amount of contrast agent and/or decrease the radiation dose to the imaged patient. For example, two important clinical applications that can benefit from a wide-coverage CT system, and the mentioned advantages thereof, are single shot axial cardiac CT and brain perfusion CT.

However, systems providing such wide coverage along the longitudinal axis can suffer from cone-beam geometry-related artefacts. While these artefacts can be, at least to some extent, reduced by suitable processing algorithms, e.g. by second-pass reconstruction methods, a reduced signal quality near the edges of the detector (particularly the first and last rows in the longitudinal direction) cannot be compensated completely by processing alone. The axial acquisition simply is not providing sufficient data for exact reconstruction over the entire longitudinal range covered by the detector near the extremes of the covered range. Particularly, second-pass reconstruction methods can fail if strong gradients are inside the projected cone, but outside the region that can be reconstructed.

Figure 4:
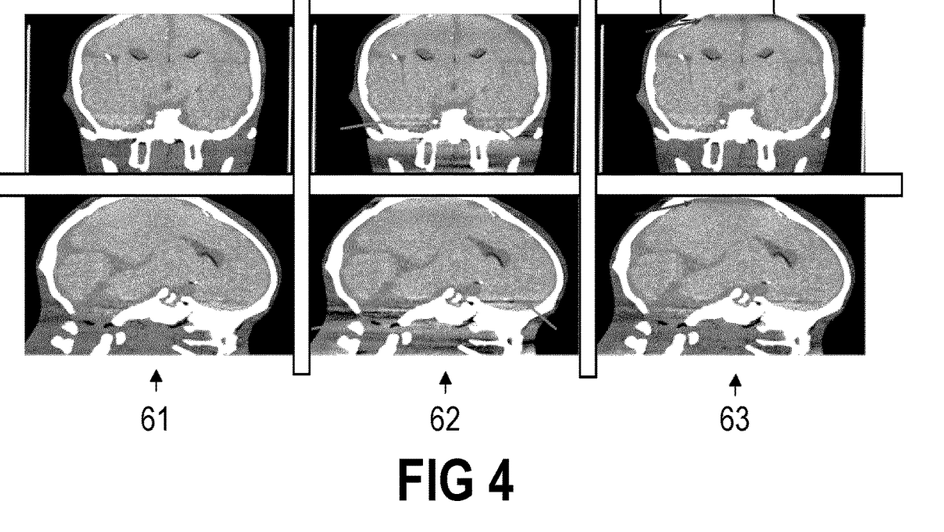
FIG. 4 shows image artefacts, in a second-pass reconstruction of wide-coverage CT, that are caused by strong gradients at the edge of, and/or outside, the reconstruction range, in a simulation to illustrate problems encountered in prior-art approaches and advantages of embodiments of the present invention.

FIG. 4 shows a simulated wide-coverage axial CT scan of the head to illustrate this problem and the artefacts associated therewith. The images 61 on the left side show sagittal and coronal views of a ground truth image. A standard nominal aperture weighted wedge reconstruction, the result of which is shown in the middle images 62, typically results in various cone-beam artefacts, as emphasized in the images by arrow pointers. These cone-beam artefacts can be reduced, e.g. by about an order of magnitude, using a second pass correction method, shown on the right in images 63. However, the second pass method clearly fails at the top of the head due to missing information regarding the object structure beyond the coverage that could be reconstructed (see remaining artefacts emphasized by arrow pointers).

The U.S. patent application US 2008/205587 relates to an alternative method of cone-beam reconstruction in CT. As already mentioned, unique challenges (compared to conventional fan-beam imaging) are posed by the use of a two-dimensional matrix-like CT detector and the spreading out of the imaging X-ray beam along the longitudinal axis (thus projecting a cone beam onto the extensive detector). These challenges are not an issue as such in conventional fan-beam imaging that involves only one or a few detector rows. However, cone-beam artifacts can be reduced by using a line-and-circle reconstruction technique instead of a conventional circular cone-beam reconstruction. The data acquired in a circular scan pattern (axial acquisition data) is, in the approach disclosed in said application, supplemented with line scan data. In the application in reference, this line scan data, used for the enhanced reconstruction, is advantageously acquired together with a surview scan, used to plan the imaging procedure.

In computed tomography (CT) imaging, scan parameters are often determined on the basis of a surview scan, which may also be referred to as a pilot, overview, scout, or pre-scan image. This can comprise a simple projection view, a combination of two or more complementary projection views, or even a quick (low dose) tomographic scan. The parameters to be applied for imaging may depend on various factors, such as the intended purpose of the tomographic image acquisition, the position of the object to be imaged and its dimensions, e.g. a patient weight, body shape, and/or volume. These parameters particularly include the selection of a scan range and field of view, e.g. by selecting a box to be imaged on the basis of the surview scan. For this selection, the operator may rely on general guidelines to determine the suitable volume to be imaged, and possibly also other scan parameters, bearing the intended purpose of the scan in mind (e.g. visualizing a specific body region, physiological and/or anatomical condition, and/or a specific suspected disease). Thus, a plan box may be placed, using a graphical user interface, in a prescribed manner with respect to recognizable anatomical landmarks, e.g. as an overlay box drawn on top of the surview scan.

However, the effect of the cone-beam geometry on image reconstruction may not be evident in a straightforward manner when selecting a suitable scan range on the basis of a surview scan, and may require an experienced operator, who is familiar with the device that is used, aware of the potential problem and attentive to such details whenever required. Particularly, the operator needs to be aware that the scan coverage and/or bounding box to be selected is not only dependent on clinical requirements, but can also be influenced by technical needs, i.e. to avoid or reduce potential artefacts.

US patent application US2011150173A1 discloses an X-ray CT system that determine first and second imaging regions to realize irradiations fields obtained for each of said imaging regions.

SUMMARY OF THE INVENTION

It is an object of embodiments of the present invention to provide in good, accurate and/or quick planning of a tomographic scan, for example to select a suitable scan region and/or other imaging parameters for an axial scan, e.g. a wide-cone axial scan.

It is an advantage of embodiments of the present invention that an image acquisition can be planned on the basis of a previously acquired image, such as a surview scan. It is a further advantage that a scan range selected by an operator, e.g. on the basis of such survey scan, can be adjusted to take image quality considerations into account.

It is an advantage of embodiments of the present invention that a body part can be imaged using a CT scanner with wide coverage, in accordance with a determined plan, without moving the scanned patient back and(/or) forth during the scan, e.g. in an axial scan mode, while achieving a good quality of the image reconstruction.

It is an advantage of embodiments of the present invention that artefacts can be avoided, e.g. motion artefacts and/or stair-step artefacts, by using an axial scan protocol with a large longitudinal (z-) axis coverage.

It is an advantage of embodiments of the present invention that regions of the body with strong image gradients can be imaged efficiently and reliably.

It is an advantage of embodiments of the present invention that cone-beam geometry-related artefacts in axial imaging can be avoided or reduced. It is an advantage of embodiments of the present invention that a second-pass image reconstruction algorithm can be (reliably and effectively) applied to acquired image data to correct (or reduce) cone-beam geometry-related artefacts.

It is an advantage of embodiments of the present invention that strong image gradients inside the beam cone but outside the region that can be reliably reconstructed, and that could lead to reconstruction artefacts, are avoided or reduced.

It is an advantage of embodiments of the present invention that such artefacts arising from brain-skull, skull-skin and skin-air transitions can be avoided in axial CT scanning of the head at large coverage.

It is an advantage of embodiments of the present invention that an increased dose to a patient, in an attempt to compensate for such image artefacts, can be avoided or reduced. A system and method in accordance with embodiments of the present invention achieves the above objective.

In a first aspect, the present invention relates to a method for planning an image acquisition of an object to be imaged by a computed tomography scanner. The method comprises obtaining a pre-scan image of the object under study using the computed tomography scanner, and obtaining a parameter selection for the image acquisition being planned based on the pre-scan image. The parameter selection comprises at least a selection of an upper and lower scan range limit in an axial direction of a region of the object to be scanned.

The method further comprises determining a value indicative of at least one image gradient and/or image gradient component in the pre-scan image at the upper and/or lower scan range limit and/or in a predetermined neighborhood of the upper and/or lower scan range limit, and determining whether the value exceeds a threshold, e.g. a predetermined threshold. The image gradient refers to a local change of an image value or image value component within the pre-scan image, i.e., a difference of image value (component) per length unit.

The method comprises, if said value exceeds said threshold, informing a user that the selected upper and/or lower scan range limit does not satisfy a quality criterion for reconstruction and/or determining a new parameter selection to avoid the image gradient(s) exceeding the threshold by repositioning the upper and/or lower scan range limit and/or resizing the scan range and/or changing an orientation of the region to be scanned.

In a method in accordance with embodiments of the present invention, said threshold may be fixed, or may be configurable. For example, a protocol selection (e.g. provided as input by a user) may be used to determine a suitable threshold, e.g. using a lookup table. In this manner, the applied threshold may (for example) be tighter for a brain imaging protocol than a skull imaging protocol.

In a method in accordance with embodiments of the present invention, the threshold may be configurable by the user, e.g. by selecting a tolerance level for potential artefacts or by directly tuning the threshold value.

In a method in accordance with embodiments of the present invention, the threshold may be determined by a calibration (which may be dependent on the specific imaging protocol or not, e.g. different calibrations may be used for different imaging protocols), e.g. by imaging a reference phantom over different scan ranges, evaluating the value indicative of the gradient property at or near the edge, and assessing the level of artefacts in a reconstruction, to determine a suitable threshold value.

Likewise, in a method in accordance with embodiments of the present invention, the neighborhood (e.g. margin width) of the edge may be fixed, may be configurable and/or may be determined by a calibration.

In a method in accordance with embodiments of the present invention, the image acquisition being planned may be a computed tomography image acquisition of the head of a human or animal subject.

In a method in accordance with embodiments of the present invention, the image acquisition being planned may be an axial scan, in which a volume of the object is imaged that covers at least 8 cm in the axial direction without thereby requiring a relative axial translation between the scanner and the object during the image acquisition.

In a method in accordance with embodiments of the present invention, the pre-scan image may comprise a two-dimensional projection image, a combination of two-dimensional projection images or a three-dimensional volumetric image.

In a method in accordance with embodiments of the present invention, obtaining the parameter selection may comprise receiving a manual parameter selection from a user. In a method in accordance with embodiments of the present invention, obtaining the parameter selection may comprise an automatic selection of the parameter or parameters based on the pre-scan image.

In a method in accordance with embodiments of the present invention, determining said value may comprise calculating an average, median or other measure of central tendency, a maximum or quantile, and/or another statistical measure over the upper and/or lower scan range edge and/or over said predetermined neighborhood thereof.

In a method in accordance with embodiments of the present invention, the user may be informed of said condition by a distinctive display style, in a user interface, of the upper and/or lower scan range limit when said value exceeds said threshold. This distinctive display style may differ from a display style of said upper and/or lower scan range limit as presented when said value is below said threshold.

In a method in accordance with embodiments of the present invention, the determined new upper and/or lower scan range limit may be presented to the user as a suggested alternative to avoid or reduce reconstruction artefacts.

In a method in accordance with embodiments of the present invention, the new upper and/or lower scan range limit may be determined by shifting the upper and/or lower scan range limit, as obtained in the parameter selection, away from the center of the scan range in the axial direction.

In a method in accordance with embodiments of the present invention, determining said value and determining whether the value exceeds said threshold can be combined in a single operation, without necessarily explicitly calculating the intermediate value.

In a method in accordance with embodiments of the present invention, determining said value may comprise applying a machine learning technique that receives, as input, the image or features derived from the image, and produces the value indicative of at least one image gradient and/or image gradient component in the pre-scan image at the upper and/or lower scan range limit and/or in a predetermined neighborhood of the upper and/or lower scan range limit.

In a second aspect, the present invention relates to a device for planning an image acquisition of an object by a computed tomography scanner. The device comprises an input for receiving a pre-scan image of the object from the computed tomography scanner, a processor, and an output.

The processor is adapted to obtain a parameter selection for the image acquisition being planned based on the pre-scan image, in which this parameter selection comprises at least a selection of an upper and lower scan range limit in an axial direction of a region of the object to be scanned.

The processor is adapted to determine a value indicative of at least one image gradient and/or image gradient component in the pre-scan image at the upper and/or lower scan range limit and/or in a predetermined neighborhood of said upper and/or lower scan range limit.

The processor is adapted to determine whether said value exceeds a predetermined threshold, and, if said value exceeds said threshold:
  a) to inform a user via said output that the selected upper and/or lower scan range limit does not satisfy a quality criterion for reconstruction and/or
  b) to determine and provide via said output a new parameter selection to avoid the image gradient(s) exceeding the threshold by repositioning the upper and/or lower scan range limit and/or resizing the scan range and/or changing an orientation of the selected region to be scanned.

A device in accordance with embodiments of the present invention may comprise a user interface for receiving an input from the user. The user interface may comprise said output. The user, using the user interface, thus can interactively plan the image acquisition and/or review the determined new parameter selection.

In a device in accordance with embodiments of the present invention, the processor may be adapted to inform the user by a distinctive display style in the user interface of the upper and/or lower scan range limit when said value exceeds said threshold. This distinctive display style is different from a display style of said upper and/or lower scan range limit when said value is below said threshold.

A device in accordance with embodiments of the present invention may comprise the computed tomography scanner, in which the computed tomography scanner may comprise a two-dimensional detector array that extends over at least 8 cm in the axial direction.

In a third aspect, the present invention relates to a computer program product for performing a method in accordance with embodiments of the first aspect of the present invention when executed on a computer.

The independent and dependent claims describe specific and preferred features of the invention. Features of the dependent claims can be combined with features of the independent claims and with features of other dependent claims as deemed appropriate, and not necessarily only as explicitly stated in the claims.

The drawings are schematic and not limiting. Elements in the drawings are not necessarily represented on scale. The present invention is not necessarily limited to the specific embodiments of the present invention as shown in the drawings.

DETAILED DESCRIPTION OF EMBODIMENTS

Figure 1:
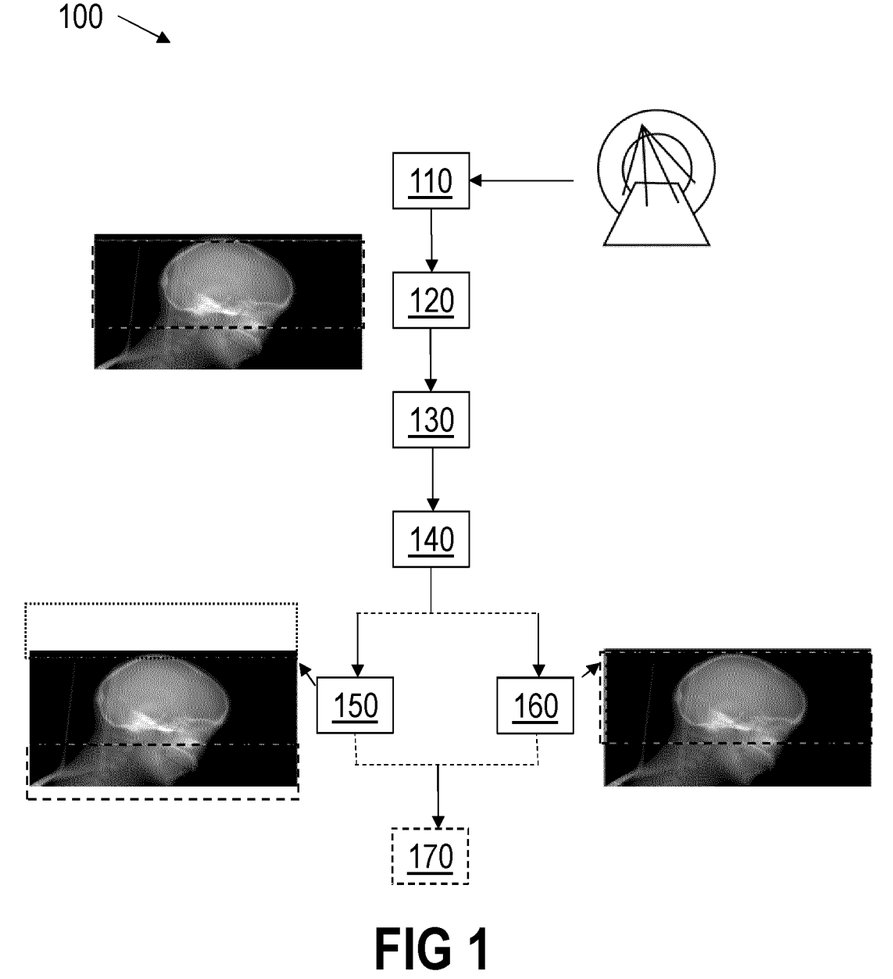
FIG. 1 shows a method in accordance with embodiments of the present invention.

Referring to FIG. 1, an example of a method 100 in accordance with embodiments of the present invention is shown. The method in accordance with embodiments of the present invention may be a computer-implemented method.

The method 100 is a method for planning a computed tomography (CT) image acquisition, to be acquired by a computed tomography (CT) scanner, for examining the internal structure of an object of interest, e.g. a human or animal subject for diagnostic or research purposes.

The method 100 may be particularly suitable for planning a CT image acquisition of the head of a human or animal subject. The CT image acquisition being planned may be an axial scan, e.g. a wide-cone axial scan (or large-coverage axial scan). Particularly, the CT scanner may be adapted for imaging a volume that covers at least 8 cm, e.g. at least 12 cm, e.g. at least 16 cm, in the axial direction (and at the iso-center) in a single gantry rotation or less. The CT image acquisition being planned may be a wide-cone axial scan for imaging a volume that covers at least 8 cm, e.g. at least 12 cm, e.g. at least 16 cm, in the axial direction (and at the iso-center) in a single gantry rotation or less. However, this does not necessarily exclude more than a single rotation, e.g. multiple rotations, in the imaging process, e.g. for the purpose of a dynamic (4D) scan, for example to examine cranial vasculature using a contrast agent. Non-axial scans are not necessarily excluded either. For example, principles of the present invention may equally apply to a helical or semi-helical scan that uses a wide-cone (e.g. in combination with a low or very low pitch).

The CT scanner may typically be configured to project a conical X-ray beam from an X-ray source, through the object under study, onto a two-dimensional detector array (e.g. forming a matrix of detector elements). The 2D detector array may comprise a plurality of rows, e.g. N rows, of one-dimensional detector arrays, in which these rows are arranged next to each other in a longitudinal direction, also referred to as the axial direction or z-axis direction. The longitudinal direction is, in use, often (e.g. typically) oriented along the caudocranial direction (body axis) of a patient to be examined (without limitation thereto).

It is an advantage that image artefacts that could arise near the edges (in axial direction) of the imaging cone when using a wide-cone imaging configuration can be avoided or reduced. Such artefacts can be particularly problematic near strong image gradients in this edge regions, such as near the air, skin and bone interfaces in a head scan. However, embodiments are not necessarily limited thereto. Other examples of anatomical regions where strong image gradients near the edges of the longitudinal scan range could potentially cause similar artefacts may include: the feet, e.g. at the heel, the shoulder, the thoracic diaphragm, the pelvis and near the paranasal sinuses. Nonetheless, this problem can be quite severe near the cranial vertex and near the base of the skull. Furthermore, even though other areas of application are conceivable, and therefore not excluded per se, imaging of the head (e.g. to study the head bones, upper airways and/or brain) is probably one of the most common situations in which this specific problem would arise in practice.

The method 100 comprises obtaining 110 a pre-scan image of the object under study to aid in the planning. The pre-scan image is typically acquired by the same CT scanner, e.g. immediately before performing the image acquisition being planned. Thus, the geometrical relationship between the position, orientation and other spatial properties of the scanner and the object under study can be ascertained, such that the features of the object that are intended to be studied will be, with a high or at least acceptable degree of certainty, present in the acquired image data. This is particularly important for flexible, deformable and/or otherwise dynamic objects, and/or for objects that are characterized by a high degree of variability between specimens, and even more so if this variability is not evident from external observation alone. Animal and human subjects are clearly deformable, non-static and variable.

The pre-scan image may comprise a projection image, a combination of projection images or a tomographic (volumetric) image. For example, as known in the art, the pre-scan image may be a surview (pilot; scout) image. The pre-scan image may be a two-dimensional projection image, e.g. a 2D surview scan image, similar to a conventional projection X-ray image, for example an anterior-posterior or lateral projection radiograph. As known in the art, such projection image may be acquired by translating the object with respect to the gantry of the CT scanner (e.g. using an automated translation couch) without rotating the gantry. However, the pre-scan image may also (e.g. alternatively) be a three-dimensional tomographic image, e.g. similar to the image acquisition being planned, but (usually) quite distinct in the image acquisition parameters being applied. For example, the 3D surview scan image may comprise (or may be) a low-dose volumetric CT scan, which may be (though not necessarily), on its own, unsuitable for diagnostic purposes due to the implied low image quality (e.g. lower signal to noise ratio, lower resolution and/or lower image contrast).

Ultra-low dose 3D CT surview scans may offer several advantages compared to conventional 2D surview scans. For example, the internal geometry (e.g. anatomy) of the object can be represented in the 3D surview without information being lost due to projective overlap.

The pre-scan image may be typically acquired using the CT scanner intended for executing the image acquisition being planned. For example, the pre-scan image (e.g. a surview scan) is acquired in-situ by the scanner, to be followed by planning the procedure on the basis of the pre-scan image and subsequently performing the planned imaging operations, e.g. to minimize or avoid any changes in the position, orientation and/or spatial configuration of the object (e.g. patient) to be imaged in relation to the scanner.

The method 100 comprises obtaining 120 a parameter selection for the tomographic (volumetric) image acquisition being planned, in which this parameter selection comprises at least a definition of a subregion and/or sub-volume of the pre-scan image, e.g. comprises at least an upper and lower scan range limit in a spatial dimension represented by the pre-scan image, e.g. particularly at least the extremes in the axial direction of the region to be scanned.

Obtaining 120 the parameter selection may comprise receiving a manual parameter selection from a user, e.g. an operator of the CT scanner. For example, the method may comprise visually presenting the pre-scan image, or an image derived therefrom, to the user, and providing a (e.g. interactive) user interface to the user to receive the parameter selection from the user. This user interface may, for example, allow the user to select an axial scan range (e.g. upper and lower endpoints in the axial direction), a rectangular region and/or a (typically box-shaped) volume (without limitation) on the pre-scan, in which this range/region/volume is intended to define which part of the object (e.g. a body part) is to be scanned by the image acquisition being planned. Thus, the pre-scan image can be used to define parameters of the image acquisition being planned, in which the parameters at least include a scan range in one dimension (the axial direction). A scan range or (2D or 3D) bounding box to be scanned may be interactively marked by the user on the displayed pre-scan image.

This interaction may also include selecting an orientation of the scan volume by the operator, e.g. rotating the bounding (2D or 3D) box around one or more axes to select a region or volume to be imaged. For example, the parameter selection may also comprise a selection of a tilt angle of the gantry (e.g. in cases where the CT scanner enables an automatic adjustment of the gantry plane), and/or a tilt angle of the support (couch) onto which the object to be imaged is positioned. While such relative angulation can affect aspects of embodiments of the present invention, it will be realized by the skilled person that any required adaptations to take such gantry or support tilt into account are typically insubstantial and/or easy to implement. For example, the effect of a tilted gantry (or substantially equivalently, tilted couch) may be easily compensated by resampling the pre-scan image (after applying an image rotation), and/or by taking the direction of tilt into account when calculating image gradients, and/or by other compensating measures.

Other imaging parameters may also be selected, such as X-ray tube parameters, e.g. beam peak energy, filtration, tube current, or generally any other parameter that affects the CT scanner configuration during the image acquisition, e.g. a target dose setting, etc.

Obtaining 120 the parameter selection may also comprise an automatic parameter selection based on the pre-scan image. Thus, planning the acquisition may comprise an automated procedure, in which the parameters are determined based on the pre-scan image, e.g. dependent on a selected type of imaging procedure. For example, an algorithm as known in the art may be applied to determine suitable imaging parameters for a specific purpose, e.g. imaging the brain of the patient. This may, for example, comprise the detection of image features, such as specific anatomical landmarks, and determining a suitable scan region based on the detected image features. Furthermore, obtaining 120 the parameter selection may also comprise a combination of parameter selection by such algorithm(s) and manual intervention, e.g. an interactive or guided parameter selection process. For example, an initial scan region may be selected automatically, and refined by a user, or a user may select a specific landmark or a point in the vicinity of a specific landmark, from which an automated process determines a suitable scan range. Many algorithms and approaches are known in the art for the automatic or semi-automatic selection of imaging parameters and/or of a scan region, and the method in accordance with embodiments of the present invention may generally include any such known algorithm or approach in the step of obtaining 120 the parameter selection, insofar suitable and compatible with other features of the method in accordance with embodiments of the present invention as presented further hereinbelow.

The method 100 comprises determining 130, e.g. automatically using a processor, a value indicative of at least one image gradient component (e.g. based on a discrete first-order spatial differentiation in one or more directions) in the pre-scan image at or near an edge of the defined subregion and/or sub-volume that limits the scan range in the axial direction.

The value indicative of the image gradient component may comprise an average, median or other measure of central tendency calculated over the edge, e.g. the line segment (or plane, e.g. when the pre-scan image is a volumetric image) forming the upper and/or lower limit, in the axial direction, of the selected subregion and/or sub-volume of the pre-scan image. Likewise, another statistical measure may be used, such as a quantile (e.g. third quartile, 90% percentile, etc.) and/or a maximum value. The measure of central tendency or other statistical measure (including, for example, a maximum) may be calculated over the pixels forming said edge, or in a margin around (or ending in) the edge, e.g. a margin of 5 pixels wide extending along, and including, the edge. The width of this margin may, for example, be less than 25 pixels, e.g. in the range of 0 (i.e. only the pixels falling on the edge) to 25 pixels, e.g. in the range of 0 to 10 pixels, e.g. in the range of 0 to 5 pixels. Alternatively, the width of the margin may be expressed in terms of the width as calibrated in the isocenter, e.g. the width of the margin may be in the range of 0 to 1 cm, e.g. in the range of 0 to 0.5 cm, e.g. in the range 0 to 0.1 cm. This margin may be symmetrical or asymmetric. For example, the margin may be comprised of mostly pixels outside the selected region/volume, yet close to the edge, or may be comprised of pixels mostly inside the selected region/volume (and close to the edge), or a combination of both.

The image gradient component (e.g. from which the summary statistic is calculated over the edge or margin around the edge) may refer to one or more Cartesian components of the spatial image gradient. Preferably, the image gradient component comprises at least a component calculated in the axial direction, i.e. the longitudinal direction of the gantry rotation axis. However, it will be understood that the direction along which the gradient is calculated does not need to correspond exactly with the longitudinal direction to be sufficiently indicative of an image gradient in that direction. For example, when a tilt angle is selected (while the pre-scan image was acquired without such tilting of the gantry), this may be taken into account by calculating a gradient component that is directed along the axial direction of the tilted gantry, or may be ignored by calculating the gradient component in the neutral axial direction without tilt (e.g. assuming that the tilt angle will not have a substantial effect).

The component(s) may be obtained by a straightforward (discrete) approximation of a component of the gradient, e.g. calculated by a subtraction of adjacent pixels (being adjacent in the direction that defines the desired component of the gradient) or by another suitable discrete estimation method, e.g. by applying a Sobel filter or similar numerical method. The value indicative of the image gradient may comprise a transformation, such as an absolute value, a squared value, or other similar transformation, to obtain a (e.g. unsigned) value indicative of the magnitude of the component or components.

The value indicative of at least one gradient component may also refer to a gradient magnitude, e.g. (optionally, root of) a sum of squared gradient components in two (e.g. for a 2D pre-scan image) or three (e.g. for a 3D pre-scan image) orthogonal directions, or values based on such gradient magnitude (including, for example, statistics calculated over the edge or a margin around the edge, as discussed hereinabove). However, it is to be noted that calculating the gradient component in the axial direction, e.g. the direction of the z-axis (or a direction that is close to said axis), may be preferable, since the artefacts that are reduced or avoided by embodiments of the present invention substantially relate to the presence of strong gradients at and/or near the axial edges of the imaged region in this direction. As will be clear from the description hereinabove, this may also comprise calculating an average, maximum, or other suitable summary statistic of this z-component of the image gradient (or of its absolute value, square, or other operation to create an unsigned value), over the edge or over a margin comprising or abutting the edge, to obtain said value (or obtaining the value therefrom after a trivial transformation, such as scaling, adding a constant, a logarithm or exponent, a power or root operation, a discrete quantization, or the like).

The value indicative of at least one image gradient component in the pre-scan image may be determined 130 at or near one edge of the defined subregion and/or sub-volume that limits the scan range in the axial direction, e.g. an upper edge of the defined scan region in the axial direction. For example, in normal use of the CT scanner, this upper edge may be intended to define a cranial or superior limit of a part of the anatomy of a patient to be examined. Depending on the type of examination, embodiments of the present invention may also relate the same for a lower edge of the defined scan region.

The value indicative of at least one image gradient component in the pre-scan image may also be determined 130 at or near both edges of the defined subregion and/or sub-volume that limit the scan range in the axial direction, i.e. the upper and lower edges of the selected scan range. A single value may be calculated, e.g. by calculating an average, maximum or other suitable statistic over both edges combined (and possibly including a suitable margin around those edges), or separate values may be calculated for each edge.

It will be understood that a value indicative of a gradient or gradient component at the edge or in the edge region can also be obtained without explicitly calculating a gradient (component). For example, machine learning techniques, such as support vector machines or neural networks, can be used to take image information (raw image data, image features, or other suitable values derived from the input image or the edge region in the image) as input and produce a value that is indicative of the predicted presence of gradient-related artefacts near the edge. Even if no explicit calculation is used, it will be clear that the produced output would still strongly correlate (not necessarily linear correlation though, e.g. in the sense of having a high mutual information) with a gradient or gradient component (or its absolute value) as considered over the edge or edge region to obtain the intended result, and therefore can be considered as a value indictive of the gradient (component) at or near the edge.

The method further comprises determining 140 whether said value exceeds a predetermined threshold. The predetermined threshold may be configurable, e.g. as a parameter controlled via the user interface, or fixed. The predetermined threshold may be defined as an absolute value or in terms of one or more other image characteristics, such as a fraction of the dynamic range of the image. For example, if the pre-scan image is normalized, e.g. to the Hounsfield scale (or a trivial, e.g. linear, transform thereof), the threshold may be defined as, as an illustrative example, at least 500 HU/voxel, e.g. a gradient threshold in the range of 500 to 1500 HU per voxel, e.g. in the range of 750 to 1250 HU per voxel, or a similar definition in Hounsfield units per unit of distance, e.g. a threshold in the range of 500 to 1500 HU per mm. However, when the pre-scan image consists of only one (or only a few) projection image(s), i.e. is not based on a tomographic reconstruction, normalization of the image intensity may be less standardized, and a suitable threshold can be chosen by the skilled person, dependent on the system characteristics and the pre-scan image preprocessing (which may e.g. include a system-specific normalization), without exercising an inventive effort. For example, the threshold may be chosen as a substantial fraction (e.g. in the range of 0.5 to 0.95, e.g. in the range of 0.6 to 0.9) of a reference image gradient value obtained in a test pre-scan image, wherein this reference value (calculated in the same manner as said determined 130 value) may be created by a sharp transition (e.g. over less than 5 mm, preferably over less than 1 mm, e.g. essentially abrupt) from a solid bone-like material (e.g. a calcium phantom) to air. This outlines an illustrative calibration approach, which is not intended to be limitative, i.e. equivalent variations on this approach can be easily envisioned by the skilled person.

It will also be understood that determining said value and determining whether said value exceeds a threshold can be combined in a single operation, e.g. without explicitly calculating the underlying value being evaluated against the threshold. Examples of this would include a machine learning classifier that outputs a Boolean value to indicate whether the threshold is exceeded or not, directly based on image input (or suitable features derived therefrom). This will be understood to be entirely equivalent, and therefore also encompassed by embodiments of the present invention. However, it will also be appreciated that determining a non-Boolean value (e.g. real or integer non-Boolean number) and testing this against a threshold may still be preferable, since it allows for easy calibration and/or configuration of a suitable threshold value without changing the underlying mechanism, e.g. retraining a machine learning model.

If the value exceeds the predetermined threshold, an operator is informed 150 that the defined subregion/volume does not satisfy a quality criterium for reconstruction and/or a new subregion and/or sub-volume is automatically determined 160 by repositioning and/or resizing the selection 120, e.g. to replace the previous selection and/or to be presented as a suggested alternative to the operator.

If the step of obtaining 120 the parameter selection comprises or consists of an automatic parameter selection, it will be understood that such automatic parameter selection may be integrated with the steps of determining the value indicative of strong edge gradients, of comparing the value(s) to the threshold and of automatically determining 160 a new subregion and/or sub-volume. In other words, the criterion of checking for strong image gradients at or near the edge or edges of the selected range may be integrated in a prior-art algorithm for automatically or semi-automatically determining a suitable scan range, such that the scan range selection of the prior-art method is further refined by adding an additional constraint that avoids strong image gradients along at least one edge (or face) of the scan region/volume that is being determined by the algorithm.

The operator may be informed 150 by raising an alert via a user interface, e.g. which may also be used to display the pre-scan image and/or to define the selection 120. The alert may be an explicit text or voice message, a warning sound, a haptic feedback signal, and/or a combination thereof. Additionally or alternatively, the operator may be informed 150 by changing a display mode of the selected subregion/volume and/or the pre-scan image. For example, a display color of the plan box representing the selected subregion/volume (e.g. as overlay on the pre-scan image) may be changed, e.g. from a white or green line color to a red line color (without limitation to this example). Instead of that, or in addition to, a change in line color, another display property of the plan box may be adjusted, such as line style, line width, etc., or an area style, such as opacity, shading and/or color of the plan box area. It will be understood that several of such illustrative display properties can be combined to ensure that the change in display style draws the attention of the operator. In other words, the (e.g. manually) selected 120 coverage window may be color-coded (or otherwise distinctly styled) to indicate the signal coverage conditions, e.g. to indicate if a window selection would not provide sufficient coverage near the edge(s) and thus might not result in a high-quality reconstruction in view of strong image gradients near this edge (or edges).

Additionally or alternatively, a new subregion and/or sub-volume may be automatically determined 160 based on the previously selected 120 subregion/volume, e.g. by repositioning and/or resizing of the previous selection 120. This adjustment 160 may be carried out automatically when the threshold test 140 is positive to correct the planned scan range automatically, or may wait for a confirmation or an instruction from the user to propose 160 a new scan range that would overcome this detected problem. The proposed correction can be displayed together with the original (e.g. manual) selection, e.g. as a suggested alternative, or may replace the previous (e.g. manual) selection.

The automatic adjustment may comprise applying a predetermined translation, e.g. a shift up or down, and/or a predetermined magnification factor, in which this shift and/or rescaling is considered to be sufficient to overcome the detected edge gradient problem. This may be an easy and straightforward approach in cases where the method is consistently applied in a well-defined application setting, e.g. only for axial head scans. This does not necessary mean that this method in such case cannot be applied to other types of examination as well. For example, knowledge of the type of imaging procedure can be taken into account to select a suitable translation step size and/or rescaling factor when this edge gradient issue is detected. This knowledge can be easily received as a protocol or procedure selection option, as selected by the user when planning the acquisition.

For example, the edge (e.g. upper or lower limit of the selected scan range) for which this gradient problem is detected can be automatically shifted by e.g. a value in the range of 1 to 100 pixels, e.g. 5 pixels, e.g. 10 pixels, e.g. 50 pixels (examples not limitative). This shift may be fixed or configurable, e.g. via an interface parameter. The direction of such shift may be predetermined, e.g. the upper boundary shifted up and the lower boundary shifted down, or may be dependent on the specific procedure or a setting. The other boundary may be shifted in the same manner, e.g. such that the scan range width remains the same, or the other boundary may remain fixed, e.g. such the scan range concomitantly increases.

A similar result can be achieved by applying a predetermined magnification factor, e.g. enlarging the scan range when needed. However, it may need to be taken into account that this is not always an option, e.g. the scan range (coverage) may already be set to its maximum achievable width for a single-rotation axial scan in the initial parameter selection. Nonetheless, the method may be adapted to consider different options, e.g. changing different parameters, to avoid the strong image gradients near the edge(s) of the scan range. Embodiments in which parameters other than position of edge(s) (e.g. shifts in the longitudinal direction) and/or scan range width are adjusted to reduce the edge gradient value to below the predetermined threshold are not necessarily excluded, e.g. a gantry tilt angle may be adjusted as alternative or additional tunable setting.

Preferably, an edge being repositioned may be shifted away from the center of the selected range, e.g. an upper edge may be shifted upward, and a lower edge may be shifted downward. This avoids the exclusion of information that is considered to be relevant for diagnostic purposes by the operator when the initial (manual) scan range was provided. This implies that the scan range may preferably increase (slightly) when the other edge remains fixed or is also (similarly) shifted in the opposite direction. Preferably, a limit may be imposed on the maximum increase of the scan range that is thus automatically determined, e.g. a maximum increase of the scan range by 10%, preferably by 5%, or even less, e.g. a maximum increase of 2% or 1%. Such limit may be explicitly imposed (e.g. by checking if the proposed new scan range does not exceed the limit) or implicitly obtained (e.g. by applying a predetermined and fixed shift of an edge when the method detects problematic strong image gradients, in which this predetermined shift does not exceed said limit). Such limit (when explicitly enforced) may equally be expressed in natural units of distance, e.g. mm, or image units, e.g. number of pixels.

As already mentioned, in some cases, shifting an edge away from the center of the selected range may not be possible, e.g. if a maximum coverage width has already been reached. In such case, a method in accordance with embodiments of the present invention may be implemented such as to prefer an enlargement of the scan range, if possible, and to shift the scan range, set at its maximum width, if not (e.g. shift both opposite edges in the same direction). Optionally, the method may inform the operator, e.g. by raising a further alert via the user interface, that some information might be lost (e.g. along the edge opposite of the edge that is being shifted to avoid strong gradients) when the newly proposed scan range is accepted. For example, the difference of the newly proposed scan region and the initial selection (e.g. in the sense of the difference of sets) may be emphasized in the user interface, such that the attention of the operator is drawn to the fact that some image information might be lost in the indicated area.

Instead of applying a predetermined (e.g. fixed) shift or rescaling of the selected scan range to define a new proposed scan range, the value indicative of image gradients may be determined for different candidate edges in order to determine a new edge of the proposed subregion/volume for which the calculated value does not exceed the predetermined threshold. For example, the method may comprise an iterative adjustment, e.g. using a relatively small step size, such as a shift by one pixel per step, in which this adjustment is repeated until the value indicative of the edge gradient(s) falls below the predetermined threshold.

The method may also comprise executing 170 the CT image acquisition in accordance with the determined parameters, e.g. in accordance with the proposed 160 new scan range (preferably after confirmed acceptance by the operator) and/or a further manual refinement of the proposed new scan range and/or a new manual selection by the operator after taking the feedback information 150 provided by the method into consideration.

Figure 5:
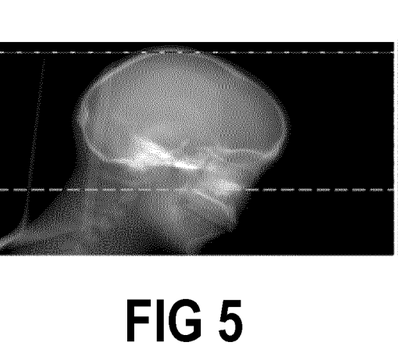
FIG. 5 shows a pre-scan image onto which an illustrative manually selected scan range is superimposed, to illustrate embodiments of the present invention.
Figure 6:
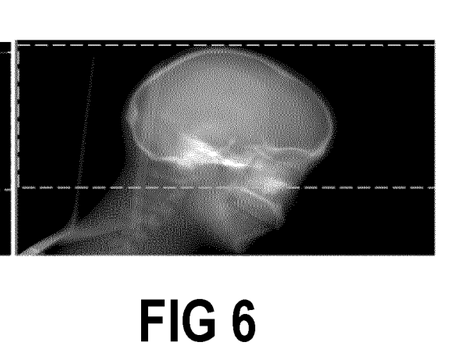
FIG. 6 shows the pre-scan image onto which an automatically adjusted scan range, based on the previous manual selection of FIG. 5, is superimposed, to illustrate embodiments of the present invention.

Embodiments of the present invention are illustrated by FIG. 5 and FIG. 6. In this (simulated) example, the pre-scan image that is obtained 110 consists of a lateral scout scan of the head of a human subject. A user selects 120 a seemingly suitable scan range for imaging the brain, e.g. for planning a brain perfusion CT that would benefit from acquiring substantially the entire brain in a single gantry rotation. In accordance with embodiments of the present invention, the value indicative of the image gradient component at or near (at least) the upper edge of the selected scan range is then calculated 130, e.g. by a processor and/or computer, and compared 140 to the predetermined threshold. In this example, it is detected that a strong image gradient is present near the upper edge of the selected scan range due to the presence of the top of the skull, and it can therefore be assumed that a reconstruction based on data acquired in accordance with this selected scan range could (or would) result in artefacts near the top of the scan range, even when applying a second pass correction of the reconstruction as known in the art for wide-coverage axial cone-beam projections. Thus, as shown in FIG. 5, the method in accordance with embodiments of the present invention indicates this condition by a different line style of the displayed scan range at the top side to inform 150 the operator of poor imaging conditions. This different style at the upper edge, as opposed to the lower edge (as shown), could also comprise, or consist of, (e.g.) a red line color as opposed to (e.g.) a green line color. Furthermore, the method in accordance with embodiments of the present invention may react to this detected problem by adjusting 160 the selected image range as shown in FIG. 6 such that this strong gradient falls (e.g. with some margin) inside the volume for which sufficient data is collected, e.g. that can be reconstructed.

Figure 7:
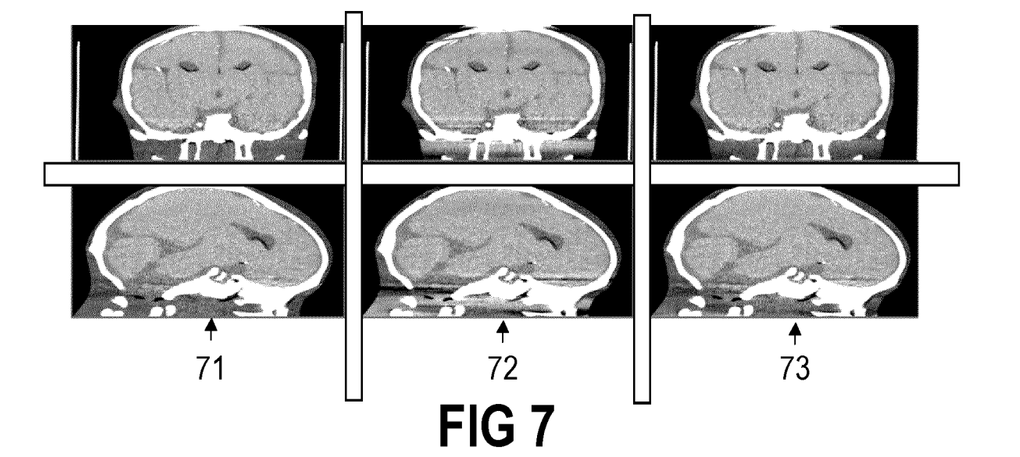
FIG. 7 illustrates image artefacts (or the lack thereof) in in a second-pass reconstruction of wide-coverage CT, in a simulation to illustrate advantages of embodiments of the present invention.

The artefacts that would arise from using the original scan range selection (see FIG. 5) are illustrated in FIG. 4 and have been discussed in detail in the background section hereinabove. The advantageous effect of applying the adjusted scan range (of FIG. 6) is illustrated in FIG. 7. The left images 71 show the ground truth image, the center images 72 show the result after a nominal aperture weighted wedge reconstruction, and the images on the right 73 show the result after an additional second pass correction, cf. respectively the images 61,62,63 in FIG. 4. By comparing the examples in FIG. 4 and FIG. 7, it becomes clear that a method in accordance with embodiments of the present invention can effectively prevent, or at least strongly reduce, the artefacts at the top of the imaged volume, e.g. as present in images 62 and substantially absent in images 72. After adjusting the scan range in accordance with embodiments of the present invention, no artefacts remain discernible at the top of the brain in the first pass reconstruction 72, nor are such artefacts created by the second pass correction 73.

More than one edge can be evaluated to ensure that no strong gradients are present at or near the limits of the selected scan range. Particularly, both the upper and lower edge in the longitudinal (axial) direction of the selected scan range may be analyzed. For example, a value indicative of image gradients, e.g. a value for each corresponding edge separately (without limitation thereto), may be checked against the predetermined threshold independently. The user may be informed of a detected problem in a manner that allows to distinguish which (if any) edge is positioned in a problematic region, e.g. by applying a different display style, e.g. a different color, specifically to the edge (or edges) for which a problem is detected. Additionally or alternatively, each problematic edge (if any) may be automatically adjusted as needed (or the thus determined alternative positioning may be proposed for approval or further manual adjustment). Each edge for which a problem is detected may, for example, be shifted independently to avoid strong gradients in the vicinity of that edge. The adjustment of both edges is, however, not necessarily independent. For example, a scan range may be determined, e.g. by a direct search and/or numerical optimization, that does not exceed the predetermined threshold for the corresponding value indicative of image gradients in the edge region(s) and, concomitantly, is as close as possible to the original (e.g. manual) selection.

Figure 8:
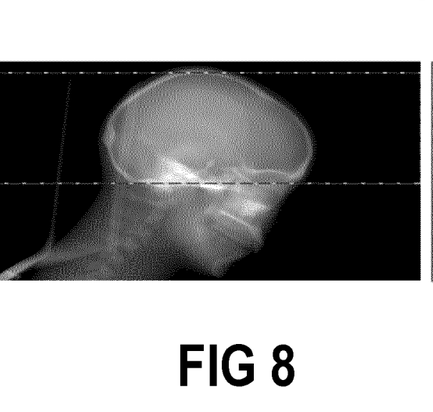
FIG. 8 shows a pre-scan image onto which another illustrative manually selected scan range is superimposed, to illustrate embodiments of the present invention.
Figure 9:
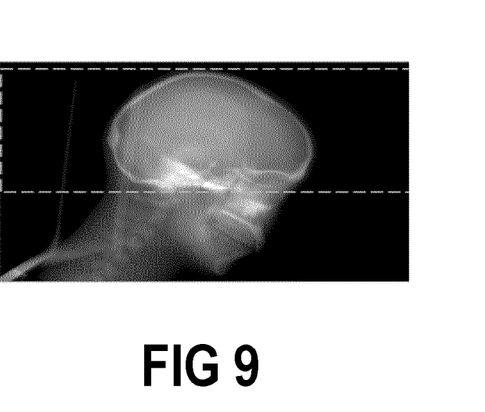
FIG. 9 shows the pre-scan image onto which an automatically adjusted scan range, based on the previous manual selection of FIG. 8, is superimposed, to illustrate embodiments of the present invention.

For example, in the example shown in FIG. 8 and FIG. 9, the same simulated lateral scout scan of the head is again used as pre-scan image. The operator, in this illustrative example, selects 120 another seemingly suitable scan range. In accordance with embodiments of the present invention, a value indicative of the image gradient component at or near the upper edge of the selected scan range is calculated 130, as well as a value indicative of the image gradient component at or near the lower edge of the selected scan range. By checking these values against the predetermined threshold, it is concluded that strong image gradients are present just outside the scan coverage on both sides, i.e. for both the upper edge and the lower edge.

Consequently, as shown in FIG. 8, a warning is provided to the user by applying a distinctive display style to both the lower and upper edges of the displayed scan range (e.g. cf. the different style applied to the lower edge in FIG. 5, which was not found to be potentially problematic). The method in accordance with embodiments of the present invention may also (additionally or alternatively) adjust 160 (e.g. enlarge) the selected scan range, as shown in FIG. 9, such that the detected strong gradients fall fully inside the scan range, e.g. such that sufficient imaging data can be acquired for reconstruction. The scan range may also be adjusted such that the detected strong gradients fall (with some safe margin) outside the scan range, e.g. by shrinking the scan range. In this approach, strong gradients would also be avoided at or close to the limits of the coverage. However, it will be appreciated that this may be a less preferable approach, even though not necessarily excluded in embodiments. Generally, it might be less desirable to reduce the selected scan range relative to a manual selection, since this carries a risk of excluding information that is potentially relevant for diagnostic purposes, while (slightly) enlarging the selected scan range is clearly less risky. Even though a dose to the patient might increase by enlarging the scan range, it is noted that this will likely be negligible in practice.

Figure 2:
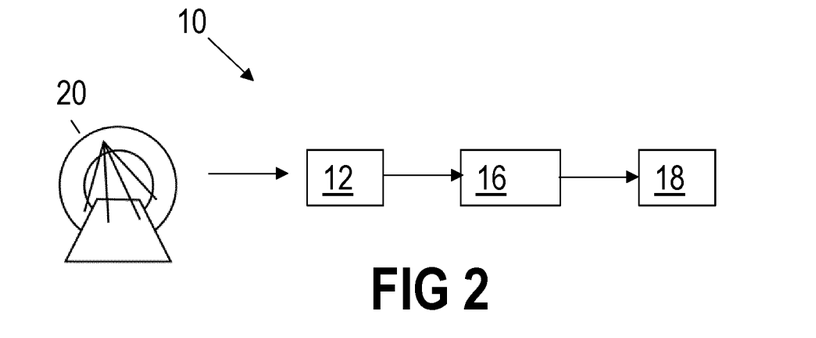
FIG. 2 shows a device in accordance with embodiments of the present invention.

In a second aspect, the present invention relates to a device for planning a CT image acquisition of an object to be imaged by a computed tomography scanner. FIG. 2 schematically shows an illustrative device 10 in accordance with embodiments of the present invention.

Features, or details of the features, of a device in accordance with embodiments of the present invention shall be clear in view of the description provided hereinabove relating to a method in accordance with embodiments of the present invention, e.g. the device may be specifically adapted to perform a method as discussed hereinabove.

The device 10 for planning the image acquisition of an object by the computed tomography scanner 20 comprises an input 12 for receiving a pre-scan image of the object from the computed tomography scanner, a processor 16, and an output 18.

The device may comprise a user interface 17 for receiving an input from a user, in which this user interface comprises the output 18, such that the user, by using the user interface, can interactively plan the image acquisition and/or review a new parameter selection as suggested by the device.

The pre-scan image may comprise a three-dimensional tomographic scan image, e.g. a 3D surview image, e.g. a low-dose 3D surview image, or a projection (2D) image, e.g. a conventional scout scan image. The input may receive the pre-scan image from the (same) tomographic imaging scanner (as intended for use in the planned image acquisition).

The CT scanner 20 may be comprised in the device or may be external to the device, and operatively connected thereto, e.g. via a network interface or a dedicated data communication system, e.g. a bus interface.

The CT scanner 20 may be a wide-coverage CT scanner, e.g. in which a two-dimensional detector array covers at least 8 cm in the axial direction (in addition to subtending an arc in the angular rotation direction of a rotating gantry system).

The processor 16 may comprise a computer or other processing device suitable for performing the functions described hereinbelow. The device may comprise executable instructions, e.g. stored in a memory, to perform these functions. The processor may be specifically designed in hardware, and/or programmed by software, to perform the functions described below.

The processor is adapted to obtain a parameter selection for the image acquisition being planned that is based on the pre-scan image. This parameter selection comprises at least a selection of an upper and lower scan range limit in an axial direction of a region of the object to be scanned.

The processor is also adapted to determine a value indicative of at least one image gradient and/or image gradient component in the pre-scan image at the upper and/or lower scan range limit and/or in a predetermined neighborhood of said upper and/or lower scan range limit.

The processor is further adapted to determine whether the value exceeds a predetermined threshold. If the value exceeds the threshold, the processor informs a user, via the output 18, that the selected upper and/or lower scan range limit does not satisfy a quality criterium (as tested by the gradient value threshold) for reconstruction and/or determines, and provides via the output, a new parameter selection by repositioning the upper and/or lower scan range limit, by resizing the scan range and/or by changing an orientation of the selected region to be scanned to avoid the detected strong image gradient(s) at or near the upper and/or lower edge of the scan range.

In a device in accordance with embodiments of the present invention, the processor 16 may be adapted to inform the user by a distinctive display style, in the user interface, of the upper and/or lower scan range limit when said value exceeds said threshold, in which this distinctive display style is different from a display style of the upper and/or lower scan range limit when the value is below the threshold.

Figure 3:
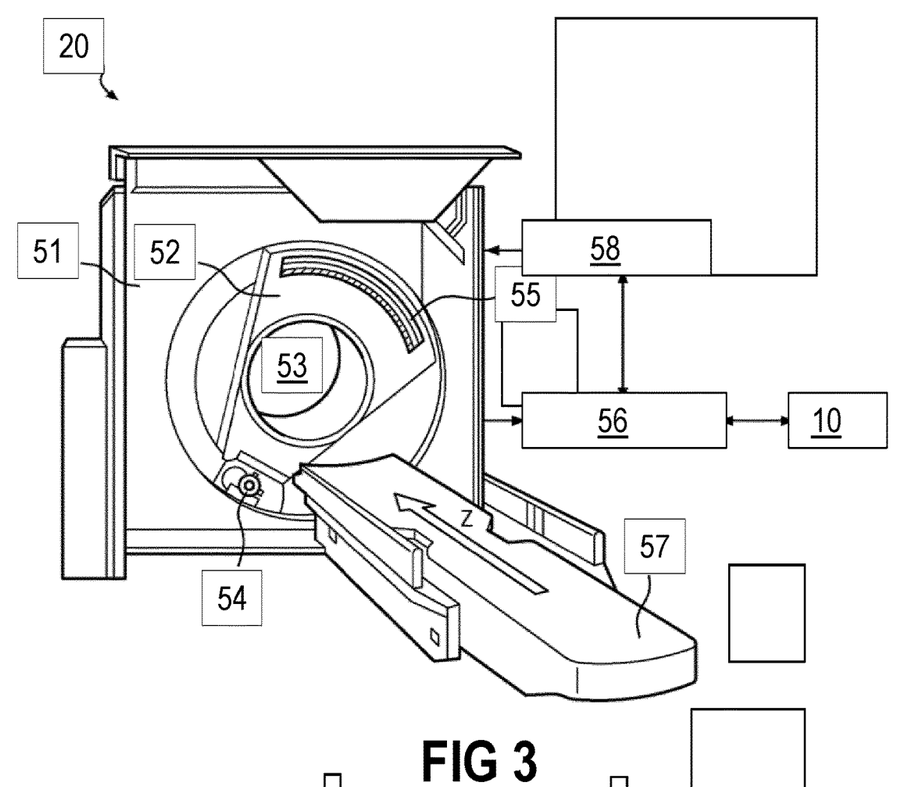
FIG. 3 illustrates a computed tomography scanner in accordance with embodiments of the present invention.

FIG. 3 illustrates, schematically, an illustrative computed tomography scanner 20 as known in the art. The CT scanner may comprise a generally stationary gantry 51 and a rotating gantry 52. The rotating gantry 52 may be rotatably supported by the stationary gantry 51 and may rotate around an examination region 53 about a longitudinal axis Z.

A radiation source 54, such as an x-ray tube, may be rotatably supported by the rotating gantry 52, e.g. such as to rotate with this rotating gantry 52, and may be adapted for emitting poly-energetic radiation that traverses the examination region 53. The radiation source 54 may comprise, or consist of, a single broad spectrum x-ray tube. Alternatively, the radiation source may be adapted for controllably switching between at least two different photon emission spectra, e.g. switching between at least two different peak emission voltages, such as 80 kVp, 140 kVp, etc., during scanning. In another variation, the radiation source 54 may comprise two or more x-ray tubes configured to emit radiation with different mean spectrums.

A radiation sensitive detector array 55 may subtend an angular arc opposite the radiation source 54 across the examination region 53. The array 55 may include a plurality of rows of detector elements arranged with respect to each other along the Z-axis (axial) direction. The CT system may be a wide-coverage system, e.g. in which the array comprises a sufficient number of rows to cover an axial range of at least 8 cm without requiring repositioning along the Z-axis.

The array 55 may be adapted for detecting radiation traversing the examination region 53, and generating signals indicative thereof. The array 55 may comprise a detector with a plurality of pixelated radiation sensitive detector elements. Optionally, different detect elements may have different x-ray energy sensitivities, e.g. at least two scintillators and at least two corresponding photosensors having corresponding optical sensitivities and/or direct conversion detection elements (directly energy-resolving detector elements), e.g. such as allow a disambiguation of different (mean) photon energies to allow a spectral image detection. Additionally or alternatively, spectral information can be obtained by switching the radiation source 54 between different energy settings.

The system may comprise a reconstructor 56 for reconstructing the signals output by the detector array 55. The reconstructor 56 may be adapted for reconstructing tomographic, e.g. cross-sectional images (e.g. perpendicular to axis Z).

The system may comprise a subject support 57, such as a couch, for supporting an object or subject in the examination region. The system may also comprise an operator console 58, e.g. a general purpose computer programmed for controlling or monitoring the scanner system and/or for providing a user interface for an operator. The console may include a human readable output device such as a monitor or display and an input device such as a keyboard and mouse. Software resident on the console may allow the operator to interact with the scanner via a graphical user interface (GUI) or otherwise. This interaction may include selecting an imaging protocol, initiating scanning, etc.

The CT scanner may be operably connected to a workstation, e.g. computing system, such as a computer, that may comprise an input/output (I/O) interface for facilitating communication with the CT scanner. This workstation may comprise the device 10 in accordance with embodiments of the present invention. The scanner system may comprise the computing system as a system-level integrated component, or the CT scanner may be adapted for communicating with a stand-alone computing system, e.g. to transmit image data to the computing system. The computing system may further comprise an output device. The output device or output devices may comprise, for example, a display monitor, a film printer, a paper printer and/or an audio output for audio feedback. The computing system may also comprise an input device or input devices, such as a mouse, a keyboard, a touch interface and/or a voice recognition interface. The computing system may also comprise at least one processor, such as a central processing unit (CPU), a microprocessor, a dedicated application-specific integrated circuit (ASIC) for processing and/or an appropriately configured programmable hardware processor such as a field-programmable gate array. The computing system may comprise a computer readable storage medium, e.g. a non-transitory memory such as a physical digital memory. The computer readable storage medium may store computer readable instructions and data. The at least one processor may be adapted for executing computer readable instructions. The at least one processor may also execute computer readable instructions carried by a signal, carrier wave or other transitory medium. Alternatively or additionally, the at least one processor may be physically configured to embody the instructions, e.g. entirely or in part, without necessarily requiring memory storage of these instructions, e.g. by configuration of a field-programmable gate array or an ASIC specifically designed to carry out at least a part of the instructions.

The computing system may be programmed, e.g. in accordance with the computer readable instructions comprising instructions to perform a method as disclosed hereinabove, to implement a system 10 in accordance with embodiments of the present invention.

In a third aspect, the present invention also relates to a computer program product, e.g. comprising the computer readable instructions referred to hereinabove, for performing a method in accordance with embodiments of the first aspect of the present invention, when executed on a computer. Embodiments of the present invention may also relate to data carrier or other non-transitory medium comprising said computer program product and/or to a transitory medium carrying the computer program product, e.g. a digital network transmission signal.

The word "comprise," as used in the claims, is not limited to the features, elements or steps as described thereafter, and does not exclude additional features, elements or steps. This therefore specifies the presence of the mentioned features without excluding a further presence or addition of one or more features.

In this detailed description, various specific details are presented. Embodiments of the present invention can be carried out without these specific details. Furthermore, well-known features, elements and/or steps are not necessarily described in detail for the sake of clarity and conciseness of the present disclosure.

In a first aspect, the present invention relates to a method for planning an image acquisition of an object to be imaged by a computed tomography scanner based on a pre-scan image of the object.

The invention claimed is:

1. A device for planning an image acquisition of an object by a computed tomography scanner, the device comprising:
   an input for receiving a pre-scan image of the object from the computed tomography scanner;
   a processor; and
   an output,
   wherein the processor is configured to:
      obtain a parameter selection for the image acquisition being planned based on the pre-scan image, in which the parameter selection comprises at least a selection of an upper and lower scan range limit in an axial direction of a region of the object to be scanned,
      determine a value indicative of at least one image gradient and/or image gradient component in the pre-scan image at the upper and/or lower scan range limit and/or in a predetermined neighborhood of the upper and/or lower scan range limit,
      determine whether the value exceeds a threshold, and; if the value exceeds the threshold:
         to indicate via the output that the selected upper and/or lower scan range limit does not satisfy a quality criterium for reconstruction, and/or
         to determine and provide via the output a new parameter selection to avoid the image gradient(s) exceeding the threshold by repositioning the upper and/or lower scan range limit and/or resizing the scan range and/or changing an orientation of the selected region to be scanned.

2. The device of claim 1, comprising a user interface for receiving the input from a user and comprising the output, such that the user, using the user interface, can interactively plan the image acquisition and/or review the determined new parameter selection.

3. The device of claim 2, wherein the processor is configured to inform the user by a distinctive display style in the user interface of the upper and/or lower scan range limit when the value exceeds the threshold, the distinctive display style being different from a display style of the upper and/or lower scan range limit when the value is below the threshold.

4. The device of claim 1, comprising the computed tomography scanner, wherein the computed tomography scanner comprises a two-dimensional detector array that extends over at least 8 cm in the axial direction.

5. A method for planning an image acquisition of an object by a computed tomography scanner, the method comprising:
   obtaining a pre-scan image of the object using the computed tomography scanner;
   obtaining a parameter selection for the image acquisition being planned based on the pre-scan image, in which the parameter selection comprises at least a selection of an upper and lower scan range limit in an axial direction of a region of the object to be scanned;
   determining a value indicative of at least one image gradient and/or image gradient component in the pre-scan image at the upper and/or lower scan range limit and/or in a predetermined neighborhood of the upper and/or lower scan range limit;
   determining whether the value exceeds a threshold, and, if the value exceeds said threshold:
      indicating that the selected upper and/or lower scan range limit does not satisfy a quality criterium for reconstruction; and/or
      determining a new parameter selection to avoid the image gradient exceeding the threshold by repositioning the upper and/or lower scan range limit and/or resizing the scan range and/or changing an orientation of the region to be scanned.

6. The method of claim 5, wherein the image acquisition being planned is a computed tomography image acquisition of a head of a human or animal subject.

7. The method of claim 5, wherein the image acquisition being planned is an axial scan, in which a volume of the object is imaged that covers at least 8 cm in the axial direction without requiring a relative axial translation between the scanner and the object during the image acquisition.

8. The method of claim 5, wherein the pre-scan image comprises a two-dimensional projection image, a combination of two-dimensional projection images, or a three-dimensional volumetric image.

9. The method of claim 5, wherein obtaining the parameter selection comprises receiving a manual parameter selection from a user.

10. The method of claim 5, wherein obtaining the parameter selection comprises an automatic selection of the parameter or parameters based on the pre-scan image.

11. The method of claim 5, wherein determining the value comprises calculating an average, median or other measure of central tendency, a maximum or quantile, and/or another statistical measure over the upper and/or lower scan range edge and/or over the predetermined neighborhood.

12. The method of claim 5, wherein the user is informed by a distinctive display style in a user interface of the upper and/or lower scan range limit when the value exceeds the threshold, in which the distinctive display style differs from a display style of the upper and/or lower scan range limit when the value is below said threshold.

13. The method of claim 5, wherein the determined new upper and/or lower scan range limit is presented to the user as a suggested alternative to avoid or reduce reconstruction artefacts.

14. The method of claim 5, wherein the new upper and/or lower scan range limit is determined by shifting the upper and/or lower scan range limit, as obtained in the parameter selection, away from the center of the scan range in the axial direction.

15. A non-transitory computer-readable medium for storing executable instructions, which cause a method to be performed to plan an image acquisition of an object by a computed tomography scanner, the method comprising:
   obtaining a pre-scan image of the object using the computed tomography scanner;
   obtaining a parameter selection for the image acquisition being planned based on the pre-scan image, in which the parameter selection comprises at least a selection of an upper and lower scan range limit in an axial direction of a region of the object to be scanned;
   determining a value indicative of at least one image gradient and/or image gradient component in the pre-scan image at the upper and/or lower scan range limit and/or in a predetermined neighborhood of the upper and/or lower scan range limit;
   determining whether the value exceeds a threshold, and if the value exceeds said threshold:

indicating that the selected upper and/or lower scan range limit does not satisfy a quality criterium for reconstruction; and/or determining a new parameter selection to avoid the image gradient exceeding the threshold by repositioning the upper and/or lower scan range limit and/or resizing the scan range and/or changing an orientation of the region to be scanned.

\* \* \* \* \*